United States Patent [19]

Temple

[11] 4,271,229

[45] Jun. 2, 1981

[54] SIZING COMPOSITION TO YIELD SIZED GLASS FIBERS WITH IMPROVED UV STABILITY

[75] Inventor: Chester S. Temple, McKees Rocks, Pa.

[73] Assignee: PPG Industries, Inc., Pittsburgh, Pa.

[21] Appl. No.: 72,392

[22] Filed: Sep. 4, 1979

[51] Int. Cl.$^3$ .............................................. D04H 1/58
[52] U.S. Cl. ............................ 428/288; 260/29.2 TN; 428/391; 428/392; 428/423.1; 428/429; 428/447
[58] Field of Search ................ 260/29.2 TN; 428/266, 428/268, 273, 391, 392, 394, 429, 447, 423.1, 295, 288

[56] References Cited

U.S. PATENT DOCUMENTS

| | | | |
|---|---|---|---|
| 3,257,343 | 6/1966 | Glaser et al. | 428/423.1 |
| 3,616,185 | 10/1971 | Goldberg | 428/417 |
| 3,803,069 | 4/1974 | McWilliams et al. | 260/29.2 TN |
| 3,814,592 | 6/1974 | McWilliams et al. | 65/3 |
| 3,837,892 | 9/1974 | Marzocchi | 428/378 |
| 3,940,357 | 2/1976 | Fahey | 428/391 |
| 4,062,999 | 12/1977 | Kondo et al. | 428/391 |
| 4,086,203 | 4/1978 | Shaw et al. | 428/392 |
| 4,137,209 | 1/1979 | Wong et al. | 428/429 |

OTHER PUBLICATIONS

A-1100: Evolution of a Family of N-Functional Silanes by James G. Marsden, pp. 1-6, 1972.
Rucothane Latex-Ruco/Hooker Chem. Corp.

Primary Examiner—James J. Bell
Attorney, Agent, or Firm—Kenneth J. Stachel

[57] ABSTRACT

Sizing compositions, sized glass fiber strands are used to produce reinforced polymeric materials that have improved UV stability while maintaining good physical properties. The sizing composition, sized glass fiber strands and reinforced polymeric materials having sized glass fiber strands involve the use of materials in the sizing composition, such as polyurethane polymers, ureidofunctional silanes, aminofunctional silanes, lubricants and processing aids.

One particular aspect of the present invention has materials associated with the sizing composition, sized glass fiber strands and reinforced polymers such as polyamides, polyethyleneterephthlate, polybutyleneterephthlate, polystyrenics, thermosetting esters, and chemically coupled polypropylene that are thermoplastic, aliphatic, polyurethane polymer dispersions, ureidofunctional silane, gamma-aminopropyltriethoxysilane, a lubricant modified gamma-aminopropyltriethoxysilane, dibutyphthalate, polyalkylene polyol lubricant, and a polyester film former.

24 Claims, No Drawings

SIZING COMPOSITION TO YIELD SIZED GLASS FIBERS WITH IMPROVED UV STABILITY

BACKGROUND OF THE INVENTION

The present invention is directed to a sizing composition useful in producing sized glass fibers having improved stability to ultraviolet radiation.

More particularly, the present invention is directed to a sizing composition and sized glass fibers produced therewith that when used in reinforced polymers yield reinforced polymers with improved color stability when subjected to light.

Light is electromagnetic radiation in the wave length range including infrared, visible, ultraviolet, and X-rays. Only about five percent of the ultraviolet radiation emitted from the sun reaches the earth's surface and this five percent is usually radiation having wave lengths longer than 290 nanometers. The light produced from man-made sources such as fluorescent lights and the like can emit ultraviolet radiation (UV) that generally has wave lengths below 290 nanometers. Most organic substances including polymers or plastics are changed on long-term exposure to light including sun light and man-made light that contains ultraviolet radiation. Prolonged exposure of polymers to UV-containing light leads to photo oxidation and degradation of the polymer. This degradation is usually manifested in the discoloration of the polymer.

It is well known in the art to use additives for polymers that give some degree of UV stability to the polymer to retard the process of photo oxidation and degradation of the polymer upon exposure to light. There must be at least ten different classes of materials used as UV stabilizers for polymers. The principle classes of UV stabilizers are the benzophenones, benzotriazoles, the salicylates, metallic complexes, substituted acrylonitriles and certain colorants. Which class or particular stabilizer within a class that should be used with a particular type of polymer depends on the specific requirements relating to polymer compatibility, permanence, and the level of absorption needed for the particular polymer, because some polymers are more sensitive to UV radiation than others. For example, polyurethanes, which are produced by reacting polyols containing an active hydrogen with isocyanate, require stabilization against photo oxidation. It is known in the art in the case of polyurethanes that the hindered amine light stabilizers, like bis(2,2,6,6-tetramethyl-piperidinyl-4)sebacate and oxalic-anilide derivatives, in combination with benzotriazoles provide excellent UV stability. In addition to the use of UV stabilizers, it is also known to add functional groups to the backbone in order to retard the photo oxidation of the polymer caused by UV radiation.

Glass fibers used as reinforcement for polymers are formed by being drawn at a high rate of speed from molten cones of glass from tips of small orifices in a platinum device called a bushing. In order to protect the glass fibers from interfilament abrasion during formation and further processing and to make then compatible with the polymers they are to reinforce, the sizing composition is applied to the glass fibers during their formation. The sizing compositions conventionally contain lubricants, film formers, coupling agents, wetting agents, emulsifiers, and the like. Many of these components are polymeric materials that can degrade by photo oxidation when subjected to radiation. The degradation of the polymers in the sizing composition on glass fibers used to reinforce polymers may lead to the discoloration of the reinforced polymeric material. Such discoloration leads to an unaesthetic appearance of a reinforced polymeric material and lack of color uniformity over a period of time for reinforced polymeric material.

OBJECTS OF THE INVENTION

It is an object of the invention to provide a sizing composition that has improved light stability.

It is another object of the present invention to provide a sizing composition for glass fibers that yields sized glass fibers having improved UV stability and a reduced tendency to discolor.

It is a further object of the present invention to provide a polymeric material reinforced with sized glass fibers wherein the sizing composition on the glass fibers has improved light stability, so as to deter imparting of discoloration to the fiber and the reinforced polymeric material upon long exposure to ultraviolet light.

It is still a further object of the present invention to provide a sizing composition, sized glass fibers that lead to the production of polymeric materials reinforced with sized glass fibers that have improved light stability without the use in the sizing composition of conventional light stabilizing agents.

It is still another object of the present invention to provide a sizing composition and sized glass fibers having improved UV stability and reduced tendency to discolor without deleteriously affecting other properties of the sizing composition and sized glass fibers.

SUMMARY OF THE INVENTION

Accordingly, the foregoing objects are accomplished by the discovery of sizing compositions comprising thermoplastic, predominantly aliphatic, curable polyurethane latices, appropriate silane coupling agents, and appropriate lubricant system.

Broadly speaking, in one aspect, the sizing composition of the present invention comprises one or more thermoplastic, predominantly aliphatic, polyurethane latices, one or more ureidofunctional silanes, one or more aminofunctional silanes.

The sizing composition can be used to treat glass fibers that are processed into any form of glass fibers such as chopped strand; roving; woven product; continuous strand, chopped strand, or needled mat; and strands and the like. Depending on what form the treated glass fibers are to be used, a compatible lubricant can be used in the sizing composition along with the polyurethane dispersion and the ureidofunctional and aminofunctional silanes. The amount of the polyurethane dispersion and the ureidofunctional and aminofunctional silanes present in the sizing composition are generally those amounts conventionally used for film formers and coupling agents in sizing compositions for glass fibers.

Also, in accordance with this invention the glass fibers are provided that have at least a portion of their surface in contact with the residue produced by removing water from the aqueous sizing composition having a curable thermoplastic, predominantly aliphatic including cyclic aliphatic polymer, ureidofunctional silane, aminofunctional silane, and usually one or more compatible lubricants.

In addition to the polyurethane polymer, ureidofunctional and aminofunctional silanes and usually a lubricant, the sizing composition may have present additional agents conventionally used in sizing compositions for glass fibers.

The use of the sizing composition and the sized glass fiber strand of the present invention can be used to produce reinforced polymeric material such as nylon, polybutylene terephthalate, polyethylene terephthalate and polystyrenics. These reinforced polymers have improved stability from the improved UV stability of the sized glass fibers while the sized glass fibers have good handleabilities, physical properties, thermal stability, and processing properties.

DETAILED DESCRIPTION OF THE INVENTION

The sizing composition, sized glass fiber strands and glass fiber reinforced polymeric material of the present invention is believed to have excellent UV stability while maintaining good glass fiber properties of handleability, thermal aging, ambient aging and processability in accordance with the following theory although the present invention is not limited by this theory.

The energy content of UV radiation is in the range of about 290 up to 400 nanometers which corresponds to about 95 to about 71.5 kilo-calories per einstein. This energy level can rupture most of the chemical bonds in polymer structures, and lower amounts of energy can rupture some of the chemical bonds in polymers. It is known that not all polymers are equally affected by UV radiation and some are more resistant than others, for example, polymethylmethacrylates and fluorocarbons are more resistant than polyethylene. Some polymers in their pure forms expected to be resistant to UV radiation are actually degraded because of contaminants that act as sights for UV energy absorption. It is known that polyurethane resins based on aliphatic components are resistant to yellowing by UV light. When polyurethane resins based on aliphatic components are to be used in a sizing composition with other sizing components, particular coupling agents must be used in order not to act as contaminants and present sights for UV energy absorption.

The thermoplastic, curable, polyurethane resins that are based on predominantly aliphatic components useful in the present invention are aqueous emulsions or solutions of polyurethane polymers formed by the reaction of an organic; linear, branced, or cyclic aliphatic isocyanate with an organic; linear, branched or cyclic aliphatic polyhydroxylated compound or hydroxyl terminated ether or polyester polymer. By the term "predominantly aliphatic" it is meant that minor amounts of aromatic materials may be present so long as the minor amount is not sufficient to permit degradation of the polyurethane by light so as to cause an unacceptable or unaesthetic amount of discoloration. The aqueous emulsion or solution of polyurethane has present in it anionic or nonionic surfactants. Particularly suitable aqueous emulsions of polyurethane polymers useful in the present invention includes "Rucothane Latex 2010L, 2030L, 2040L, 2050L, and 2060L," available from Ruco Division of Hooker Chemical Corporation, New York. The materials are thermoplastic polyurethane latices having a varying particle size of a high molecular weight isocyanate based thermoplastic elastomer in a water dispersion with an anionic or nonionic surfactant. The Rucothane latices are based on aliphatic isocyanates and have a polymer solids content of the stable emulsions ranging from 55 to 65 percent by weight where the urethane polymer has an ester backbone. The Rucothane latexes have a Brookfield RVF 4 viscosity in centipoise at 2 RPM ranging from 7000 for the "2060L" up to 25,000 for the "2020L" latices. The preferred Rucothane latex used in the sizing composition of the present invention is the resin designated "2010L" because of the improved processability obtained with glass fibers treated with a sizing composition containing this particular Rucothane resin. Also the polyurethane product made with isocyanates designated "Hylene W" available from Dupont may be used. The amount of the thermoplastic polyurethane latex present in the sizing composition is generally a major amount of the solids in the sizing composition and is preferably in the range from about 40 to about 95 weight percent of the sizing composition based on the non-aqueous solids of the sizing composition and from about 2 to about 50 weight percent based on the aqueous sizing composition.

Any suitable ureidofunctional silanes can be used in the sizing composition of the present invention. Non-exclusive examples include compounds with the following formula:

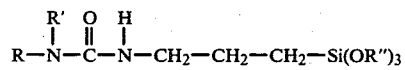

wherein R and R' can be a hydrogen atom or methyl group and wherein R" is a methyl or ethyl group. The ureidofunctional silanes are generally neutral and water soluble materials that have reduced reactivity at lower temperatures with many matrix resins. One particularly useful ureidofunctional silane for the sizing composition of the present invention is designated "A-1160" and is available as 50 percent concentration in methanol solution from Union Carbide Corporation, New York. The "A-1160" has a formula molecular weight of 264.1, a flash point of 43 as determined by ASTM method D-56 using a tag closed cup, and has a specific gravity at 25/25° C. of 0.988, and a refractive index at 25° C. of 1.386. The amount of ureidofunctional silane used in the sizing composition of the present invention is generally in the range of about 0.05 to about 2.0 weight percent based on the aqueous sizing composition and about 1 to about 4 weight percent of the non-aqueous solids in the sizing composition.

Any suitable aminofunctional silane can be used in the sizing composition of the present invention. These aminofunctional silanes range in composition from the single primary amino group of gamma-aminopropyltriethoxysilane to the primary-secondary diaminofunctional silane of N-beta(aminoethyl) gamma-aminopropyltrimethoxysilane and polyaminofunctional silanes. One particularly useful aminofunctional silane for the sizing composition of the present invention is gamma-aminopropyltrimethoxysilane available commercially under the designation "A-1100" from Union Carbide Corporation. The amount of aminofunctional silane used in the sizing composition of the present invention is in the range from about 0.05 to about 2.0 weight percent of the total aqueous sizing composition and from about 1 to about 5 weight percent of the sizing composition based on the non-aqueous solids in the composition.

Lubricants which are suitable for use in the sizing composition of the present invention can be any cationic, anionic, or nonionic lubricant or mixture thereof. Preferably, lubricants are used in the sizing composition and the particular lubricant used will vary with the particular form in which the sized glass fibers will be used, e.g., chopped strands, roving, woven strand, mat and the like. Particularly suitable lubricants are those designated "Emery 6717" and "Emery 67-U" both of which are amide substituted polyethylene amines commercially available from Emery Industries. In addition polytetrafluoroethylene fluorocarbon resin dispersions, for example, "Teflon" resin dispersion can be employed as lubricants in the dispersion of this invention. Also, the lubricant can be a combination of lubricants such as Emery Lubes 6717 and Emsorb 6901 available from Emery Industries. When the sizing composition is used to treat glass fibers that will eventually be chopped to produce the preferred sized glass fibers strand form, i.e., chopped strand, it is preferred to use a combination of lubricants. This preferred combination of lubricants include one or more polyoxyalkylene and/or polyalkylene polyol lubricants such as "Pluracol ® V-10 or V-7 polyols" both available from BASF Wyandotte Corporation from Michigan. The product, "Pluracol ® V-10 polyol," is a viscous, high molecular weight, liquid polyoxyalkylene polyol with a specific gravity at 60° F./60° F. by BWC test of 1.089 with a flash point by ASTM D92-52 of 510° F. The product, "Pluracol ® V-7 polyol," is a water-soluble, high molecular weight, viscous, liquid polyalkylene polyol with a specific gravity at 25° C./25° C. of 1.090 and flash point of 510° F. Also, this lubricant combination includes a lubricant modified aminosilane, for example, "Y-9072 lubricant modified A-1100 silane" available from Union Carbide Corporation having a flash point of 145° F. as determined by ASTM method D-93 using a Pensky closed cup with a specific gravity of 0.998 at 25/25° C. and a refractive index at 25° C. of 1.438. The use of this preferred combination of lubricants facilitates further processing and fabrication of glass fibers into chopped strand.

The amount of lubricant employed in the sizing composition of the present invention is within the range of about 0.2 to about 2 weight percent of the aqueous sizing composition. If more than one type of lubricant is employed then the total lubricant in the sizing composition can range from about 0.2 to about 5 weight percent of the aqueous sizing composition.

In addition to the linear or branched but preferred cyclic aliphatic polyurethane, and ureidofunctional silane and aminofunctional silane, and preferably lubricant components of the sizing composition, additional agents may be added to the sizing composition. Non-exclusive examples of additional agents that may be used are coupling agents, film formers, film former modifiers, lubricants, adhering agents such as Ruco Catalyst, available from Hooker Corporation, cross-linking agents such as "Cymel 370" available from American Cyanamid Corporation and other similar additives. It is preferred to have present in the sizing composition additional agents that perform the function of processing aids. The preferred processing aids include dibutylphthalate (DBP) that acts as a plasticizer for the polyurethane cured film. Another preferred processing aid present in the sizing composition of the present invention is a polyester film former such as "RD-1135B" available from PPG Industries, Inc. that reduces binder throw off and acts as an antioxidant. In general the amount of additional agents present in the sizing component of the present invention are those amounts conventionally used to perform the function for which the agent is added to the sizing composition.

The amounts of DBP added to the sizing composition are in the range of about 0.05 to about 5 weight percent based on the non-aqueous solids of the sizing composition. The amount of RD-1135B added to the sizing composition is in the range of about 2 to about 15 weight percent based on the non-aqueous sizing composition.

The sizing composition of the instant invention is prepared by mixing the polyurethane dispersion with water in a mixing tank with aggitation. To the polyurethane dispersion-water mixture there is added the dibutylphthalate (DBP) and it is dispersed well into the polyurethane with moderate agitation. In a separate vessel the ureidofunctional silane, the aminofunctional silane, and a lubricant modified silane, "A-1100" silane, "A-1160" silane and "Y-9072" silane respectively are premixed with water and hydrolized for a short period of time. After the silanes are premixed they are combined with the mixture of DBP, polyurethane and water. The lubricant is diluted with water, preferably hot water and cooled and then added to the combination of coupling agents and polyurethane mixture. After this addition the processing aids can be added to the mixture. The mixture is then diluted to final volume with water. The mixture is checked for its pH characteristic, its solids content and viscosity. Typically, the overall solids content of the sizing composition can vary from about 4 to about 20 percent by weight. It should be noted that the solids content can be adjusted in accordance with the desired solids content for the specific forming condition employed. Generally, the solids content will range from about 5 to about 10 percent by weight and preferably from 6.5 to 8.5 percent by weight. By solids content it is meant the residual solids remaining after drying the sizing composition at about 105° C. to constant weight. In all events, the solids content of the sizing composition should be adjusted so that the viscosity at 20° C. of said sizing solution does not exceed 100 centipoise. This viscosity restriction is necessary in order that the filaments do not break during the application of the sizing solution.

In applying the sizing composition of the instant invention to glass fibers, the glass fiber strand is formed by a multitude of fine fiber glass filaments which are drawn at a high rate of speed through molten cones of glass located at the tips of small orifices in a bushing such as is shown in U.S. Pat. No. 2,133,238. During formation, the filaments are coated while they are moving at speeds on the order of 5,000 to 20,000 fpm with the forming size of the instant invention. The sizing composition may be sprayed on the fibers as they are being drawn or in the preferred embodiment the fibers may be drawn across the surface of a roller applicator on which the sizing composition is placed. The fibers sizing are grouped into strands which are then wound, typically, onto forming packages utilizing a winder and an associated paper or plastic or other type of forming tube located on the surface of the winder in the conventional manner.

The forming packages containing the glass fiber strand sized with the sizing composition of the instant invention may then be formed into roving by unwinding a plurality of strands from several forming packages positioned on a creel and combine the strands into parallel form and winding the strands on tubular support in the conventional manner, or into chopped strands by feeding the sized glass fiber strands through a chopper in a conventional manner, or into a mat or woven glass fiber product. The preferred glass fiber form for which the sizing composition of the instant invention is used is the chopped glass fiber strand, which is preferably formed by chopping sized glass fiber strands that are obtained from a plurality of forming packages located on a creel rather than chopping a plurality of sized glass fibers during the glass fiber forming process.

The glass fiber strands in any form, but preferably in the form of chopped strand sized with the sizing composition of the present invention can be used to reinforce any polymeric material and obtain a product that has better UV stability while still maintaining satisfactory physical properties. It is preferred to use the sized glass fibers of the present invention as reinforcement for polymeric material such as polyamide (nylon), polyethylene terephthalate (PET), polybutylene terhthalate (PBT), polystyrenics (PS), thermosetting polyester, and chemically coupled polypropylene like the product of Hercules Chemical Corporation designated "PCO-72" which is a blend of homopolymer of polypropylene and a polypropylene polymer grafted with maleic anhydride. It is most preferred to use the sized glass fibers in the form of chopped strand as reinforcement for polyamide materials.

The following examples will further elucidate the concept of the present invention.

Sizing compositions were prepared from the formulations of Table I.

The sizing formulations shown in Table I were prepared by placing approximately 7.6 liters of water in a premix tank and stirring in the stated amount of polyurethane resin dispersion with low speed stirring. Following this mixing, the stated amount of the dibutylphthalate was dispersed well into the polyurethane polymer dispersion with moderate speed stirring. After this dispersion was prepared, the coupling agents, the ureidofunctional silane, aminofunctional silane, and, if any, the lubricant modified silane were premixed and hydrolized in approximately 75.7 liters of water. The dispersed polyurethane polymer mixture was then added to the hydrolized silane mixture. After this addition, the lubricant was dissolved in approximately 3.786 liters of hot water and cooled with approximately 11.4 liters of water which was then added to the mixture of coupling agent and polyurethane polymer. After this addition, processing aids such as the polyester film former, RD-1135B was diluted with an equal quantity of water and added to the mixture of lubricant coupling agents and polyurethane polymer. After these additions, the mixture was diluted to approximately the quantity of sizing composition indicated with water and the pH and solids characteristics were obtained.

The sizing formulation of Table I were applied to glass fiber strands in the conventional manner as described above to produce glass fiber strands of the K-37 dimension or G-67.5, although a sizing composition of the present invention can be used to treat glass fibers to produce glass fiber strands of any dimension. After the glass fibers were treated with the sizing compositions of Table I and gathered into glass fiber strand in the form of a forming package, the strands were prebaked for approximately 12 hours at approximately 240° F. (116° C.). The dried glass fiber strands were then chopped in a conventional manner to a chopped length of ⅛".

Sized, chopped glass fiber strands prepared with sizing compositions like those stated in Table I were tested for their UV stability and other physical properties when used to reinforce polyamides. The results of this testing are shown in Table II.

TABLE I

SIZING COMPOSITIONS
Formulations In Grams Of Ingredient/Indicated kg of Sizing

| Sizing Components | Formulation 1 | Formulation 2 | Formulation 3 | Formulation 4 | Formulation (Wt. %) 5 |
|---|---|---|---|---|---|
| Quantity of Sizing (kg) | 18.9 | 9.46 | 9.46 | 9.46 | 189.2–(41.6) |
| Polyurethane polymer dispersion (Rucothane polymer dispersion 2010L) | 1760 | 925 | 925 | 925 | 18,500–(40.8) |
| Ureidofunctional Silane (A-1160 silane) | 165 | 66 | 33 | 66 | 1,320–(2.9) |
| Aminofunctional Silane (A-1100 silane) | 61 | 33 | 66 | 33 | 660–(1.4) |
| Dibutyphthalate (DBP) | — | 25 | 50 | — | 1,000–(2.2) |
| Lubricant (Emsorb 6901) | 55 | — | — | — | — |
| 2 aminopropanol (2-AMP-95) | 55 | — | — | — | — |
| Amide Substituted polyethyleneamine lubricant (Emery 6717) | 6 | — | — | — | — |
| Polyalkylene polyol lubricant (Pluracol V-10) | — | — | — | 40 | 50–(0.1) |
| Lubricant modified Silane (Y-9072) | — | — | — | — | 20–(0.04) |
| Polyester film former (RD-1135B) | — | — | — | — | 5,000–(11.0) |
| Properties of Sizing Composition | | | | | |
| pH | 9.5 | 9.3 | 9.6 | 9.0 | 10. |
| Solids | 6.8 | 6.95 | 6.7 | 7.0 | 7.8 |
| Sized Glass Fiber Properties | | | | | |
| Percent LOI on K-37 strand | 0.99 | 1.2 | 0.98 | 0.99 | 1.25 |

TABLE II

Physical Properties For Polyamide Reinforced With Chopped Strand Sized With Sizing Composition of Invention or Commercial Sizing

| Chopped Strand Type | % LOI | % CS | Sunlamp Color Stability[1] | Flex Str. (psi) | Flex Mod (× 10⁶psi) | Ten Str. (psi) | Impact Strength Notch (fpi) | Impact Strength Reverse (fpi) |
|---|---|---|---|---|---|---|---|---|
| 3/16" Commercial[2] | 0.95 | 32 | Good(5)[3] | 34,800 | 1.28 | 21,100 | 2.86 | 11.8 |
| ¼" Table I Form 1 (like) | 1.15 | 32.9 | Excellent (1-2) | 37,600 | 1.28 | 22,900 | 3.45 | 14.7 |
| ⅛" Table I Form 1 (like) | 1.13 | 31.7 | Excellent (1-2) | 37,700 | 1.29 | 23,000 | 3.67 | 15.1 |
| ⅛" Table I Form 5 | 1.25 | 32.4 | Excellent (1-2) | 38,400 | 1.25 | 22,600 | 2.89 | 15.1 |

[1] 24-Hour Sunlamp Exposure
[2] Owens Corning Fiberglass Corp. product designated "419AA, TSL."
[3] On a scale of 1 to 10 with 1 the best and 10 the poorest.

The results of Table II indicate that the polyamide material reinforced with chopped glass fiber strand having the sizing composition of the present invention produce a reinforced polyamide material that has excellent UV stability while maintaining good physical properties.

The foregoing has described sizing compositions, sized glass fiber strands and reinforced polymeric materials with sized glass fiber strand of the present invention. The invention involves the presence of sizing materials on glass fiber strands and in reinforced polymeric materials that lead to the properties of improved UV stability while maintaining good physical properties. This is accomplished by having a sizing composition, sized glass fiber strands, and polymeric materials reinforced with sized glass fiber strands wherein materials in the sizing include one or more polyurethane polymers, preferably in the form of a dispersion, one or more ureidofunction silanes, one or more aminofunctional silanes and one or more appropriate lubricants depending on the form in which the glass fibers are to be used, preferably polyalkylene, polyol type lubricant with a lubricant modified aminosilane and processing aids such as polyester film formers or film former modifiers and plasticizers.

I claim:

1. A sizing composition for glass fibers to produce sized glass fibers having improved UV stability, comprising:
   (a) one or more thermoplastic, predominantly aliphatic, elastomeric, curable polyurethane polymers,
   (b) one or more ureidofunctional silanes, and
   (c) one or more aminofunctional silanes.

2. The sizing composition of claim 1 wherein one or more glass fiber lubricants are present.

3. The sizing composition of claim 1 wherein the polyurethane polymer is in the form of a dispersion wherein the polyurethane polymer is emulsified.

4. The sizing composition according to claim 1 wherein the aminofunctional silane is gamma-aminopropyltriethoxysilane.

5. The sizing composition according to claim 2 wherein the glass fiber lubricant is an amide substituted polyethyleneimine.

6. The sizing composition according to claim 2 wherein the glass fiber lubricant is one or more polyoxyalkylene and/or polyalkylene polyols.

7. The sizing composition according to claim 2 wherein the glass fiber lubricant is one or more polytetrafluoroethylene fluorocarbon resin dispersions.

8. The sizing composition according to claim 1 wherein the ureidofunctional silane is selected from the group consisting of gamma-ureapropyl-triethoxysilane, gamma-methylureapropyltriethoxysilane, gamma-dimethylurea-propyltriethoxysilane.

9. The sizing composition according to claim 1 which has present dibutylphthalate.

10. The sizing composition according to claim 1 having present one or more lubricant modified gamma-aminopropyltriethoxysilanes.

11. The sizing composition according to claim 1 having present one or more polyester resin film formers.

12. The sizing composition according to claim 3 wherein the polyurethane polymer dispersion is present in the amount in the range of about 75 to 95 weight percent based on the aqueous sizing solution, and the ureidofunctional silane is present in an amount of about 0.05 to about 2.0 weight percent of a total aqueous sizing composition and the amino silane is present in an amount of about 0.05 to about 2.0 weight percent of the total aqueous sizing composition and the glass fiber lubricant is present in an amount of about 0.05 to about 5 weight percent of the total aqueous sizing composition.

13. The sizing composition according to claim 9 wherein the dibutylphthalate is present in an amount of about 0.01 to about 2 weight percent of the total aqueous sizing composition.

14. The sizing composition according to claim 10 wherein the amount of lubricant modified gamma-aminopropytriethoxysilane present is in the range of about 0.05 to about 2 weight percent of the total aqueous sizing composition.

15. The aqueous sizing composition according to claim 10 wherein the polyester film former is present in an amount of about 0.05 to about 15 weight percent of the total aqueous sizing composition.

16. Glass fibers having thereon a dried residue of a sizing composition comprising:
   (a) one or more thermoplastic, predominantly aliphatic elastomeric, curable polyurethane polymers,
   (b) one or more ureidofunctional silanes,
   (c) one or more aminofunctional silanes,
   (d) one or more glass fiber lubricants, and
   (e) a major amount of water.

17. Glass fibers having thereon the dried residue of a sizing composition comprising:
   (a) one or more thermoplastic, predominantly aliphatic elastomeric, curable polyurethane polymers,
   (b) one or more ureidofunctional silanes,
   (c) one or more aminofunctional silanes,
   (d) one or more glass fiber lubricants,
   (e) a major amount of water, (f) one or more lubricant modified silanes,
(g) dibutylphthalate,
(h) one or more water dispersible, condensation, cross-linkable unsaturated polyester resins,
(i) a major amount of water.

18. The glass fibers according to claim 17 wherein the glass fiber lubricant is one or more amidopolyethyleneimines.

19. Glass fibers of claim 17 wherein the glass fiber lubricant is one or more polyoxyalkylene and/or polyalkylene polyols.

20. Glass fibers according to claim 17 wherein the polyurethane is a water dispersion with the polyurethane resin emulsified therein.

21. Glass fibers according to claim 17 wherein the aminofunctional silane is gamma-aminopropyltriethoxysilane.

22. A molded reinforced polymeric material having improved UV stability, comprising:
(a) polymeric material selected from the group consisting of polyamides, polyethyleneterephthalate, polybutyleneterephthalate, polystyrenics, and chemically coupled polypropylenes,
(b) reinforcing glass fibers sized with a composition comprising aliphatic, thermoplastic, elastomeric, polyurethane polymers, one or more ureidofunctional silanes, one or more aminofunctional silanes and one or more glass fiber lubricants.

23. Glass fibers having the dried residue of the sizing composition of claim 1.

24. Sizing composition according to claim 1 wherein the one or more ureido-functional silanes and one or more amino-functional silanes have been hydrolized.

* * * * *